United States Patent
Sethi

(10) Patent No.: US 7,539,701 B2
(45) Date of Patent: May 26, 2009

(54) GENERIC INFRASTRUCTURE FOR MIGRATING DATA BETWEEN APPLICATIONS

(75) Inventor: Manish Sethi, Delhi (IN)

(73) Assignee: Microsoft Corporation, Redmond, WA (US)

(*) Notice: Subject to any disclaimer, the term of this patent is extended or adjusted under 35 U.S.C. 154(b) by 255 days.

(21) Appl. No.: 11/601,951

(22) Filed: Nov. 20, 2006

(65) Prior Publication Data

US 2008/0120333 A1 May 22, 2008

(51) Int. Cl.
*G06F 17/00* (2006.01)
(52) U.S. Cl. .................. 707/103 R; 707/100; 707/200
(58) Field of Classification Search ............. 707/103 R
See application file for complete search history.

(56) References Cited

U.S. PATENT DOCUMENTS

| | | | | |
|---|---|---|---|---|
| 5,875,435 | A | 2/1999 | Brown | 705/30 |
| 6,363,362 | B1* | 3/2002 | Burfield et al. | 705/40 |
| 6,529,909 | B1 | 3/2003 | Bowman-Amuah | 707/10 |
| 6,665,677 | B1* | 12/2003 | Wotring et al. | 707/100 |
| 6,826,568 | B2 | 11/2004 | Bernstein et al. | 707/6 |
| 6,853,997 | B2* | 2/2005 | Wotring et al. | 707/100 |
| 7,031,956 | B1 | 4/2006 | Lee et al. | 707/3 |
| 7,130,863 | B2 | 10/2006 | Diab | 707/103 |
| 7,418,456 | B2* | 8/2008 | Charlet et al. | 707/102 |
| 2002/0156814 | A1* | 10/2002 | Ho | 707/514 |
| 2003/0018658 | A1* | 1/2003 | Suermondt et al. | 707/204 |
| 2003/0216990 | A1 | 11/2003 | Star | 705/35 |
| 2004/0054626 | A1 | 3/2004 | Fuentes | 705/42 |
| 2004/0153462 | A1* | 8/2004 | Bardwell | 707/100 |
| 2004/0181753 | A1 | 9/2004 | Michaelides | 715/523 |
| 2005/0022154 | A1 | 1/2005 | Chung et al. | 717/100 |
| 2005/0065942 | A1* | 3/2005 | Diab | 707/100 |
| 2005/0102370 | A1* | 5/2005 | Lin et al. | 709/217 |
| 2005/0240467 | A1 | 10/2005 | Eckart et al. | 705/10 |
| 2006/0190814 | A1* | 8/2006 | Collie et al. | 715/513 |
| 2008/0134019 | A1* | 6/2008 | Wake et al. | 715/239 |

FOREIGN PATENT DOCUMENTS

| | | |
|---|---|---|
| WO | WO 0120504 | 3/2001 |
| WO | WO 0157613 | 8/2001 |
| WO | WO 2006032063 | 3/2006 |

OTHER PUBLICATIONS

International Search Report issued in International Application No. PCT/US2007/079579 filed Sep. 26, 2007.

(Continued)

*Primary Examiner*—Don Wong
*Assistant Examiner*—Binh V Ho
(74) *Attorney, Agent, or Firm*—Theodore M. Magee; Westman, Champlin & Kelly, P.A.

(57) ABSTRACT

A field map is applied to elements in a data representation of data from a source database to identify schema elements in a schema. Hierarchical relationships between schema elements that are described in the schema are used to construct a hierarchical data representation from the data representation. Based on the hierarchical relationship between two elements in the hierarchical data representation, it is determined that a first database object must be instantiated before a second database object. After ensuring that the first database object has been created and stored, the second database object is created and stored.

10 Claims, 5 Drawing Sheets

OTHER PUBLICATIONS

Written Opinion issued in International Application No. PCT/US2007/079579 filed Sep. 26, 2007.

Elder et al., "Use and Reuse of Databases," 3rd Conference on Re-engineering of Information Systems, 1994, http://143.205.180.128/Publications/pubfiles/1994-0002-EdFr.pdf.

Bhushan et al., "Federated Accounting Management System Architecture for Multimedia Service Usage Management," IFIP/IEEE MMNS02, Oct. 2002, https://kdeg.cs.tcd.ie:444/form/results/papers/pdf/mmns02.pdf.

* cited by examiner

GENERIC INFRASTRUCTURE FOR MIGRATING DATA BETWEEN APPLICATIONS

BACKGROUND

In many software product areas, there are several competing software programs that are available to perform certain tasks. For example, there are several accounting software programs available to consumers.

Typically, each software program stores the data it generates in a different format than its competitors. For example, information stored in a single field in a single table in one computer application may be stored in multiple fields across multiple tables in a competing application.

The differences between the ways competing software applications store data creates a barrier to switching from one software application to a competing software application since changing software applications requires migrating existing data from the format of the old application to the format of the new application. Such data migration must be handled carefully to ensure that data integrity is maintained and that fields in one application are properly mapped to fields in the other application.

The discussion above is merely provided for general background information and is not intended to be used as an aid in determining the scope of the claimed subject matter.

SUMMARY

A field map is applied to elements in a data representation of data from a source database to identify schema elements in a schema. Hierarchical relationships between schema elements that are described in the schema are used to construct a hierarchical data representation from the data representation. Based on the hierarchical relationship between two elements in the hierarchical data representation, it is determined that a first database object must be instantiated before a second database object. After ensuring that the first database object has been created and stored, the second database object is created and stored.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments herein migrate data from a source database to a destination database using data maps to map fields from the source database to intermediate fields in a well-formed data representation. A schema that describes the hierarchical relationship of database objects in the destination database and a field map are then used to convert the well-formed data representation into a hierarchical data representation. The hierarchical data representation is then imported into the destination database by creating database objects based on the hierarchical data representation.

Figure 1:
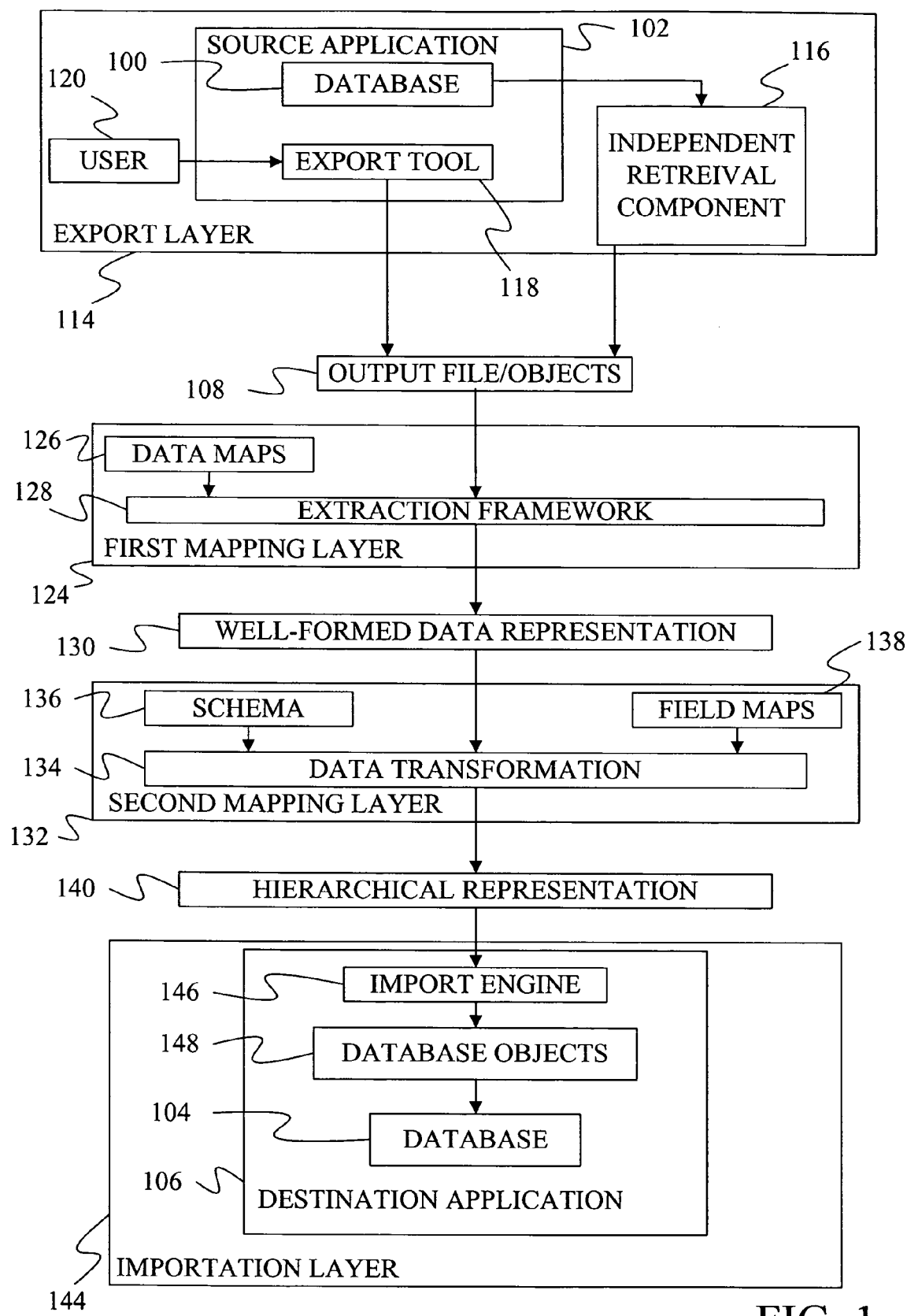
FIG. 1 is a block diagram of elements used to migrate data.
Figure 2:
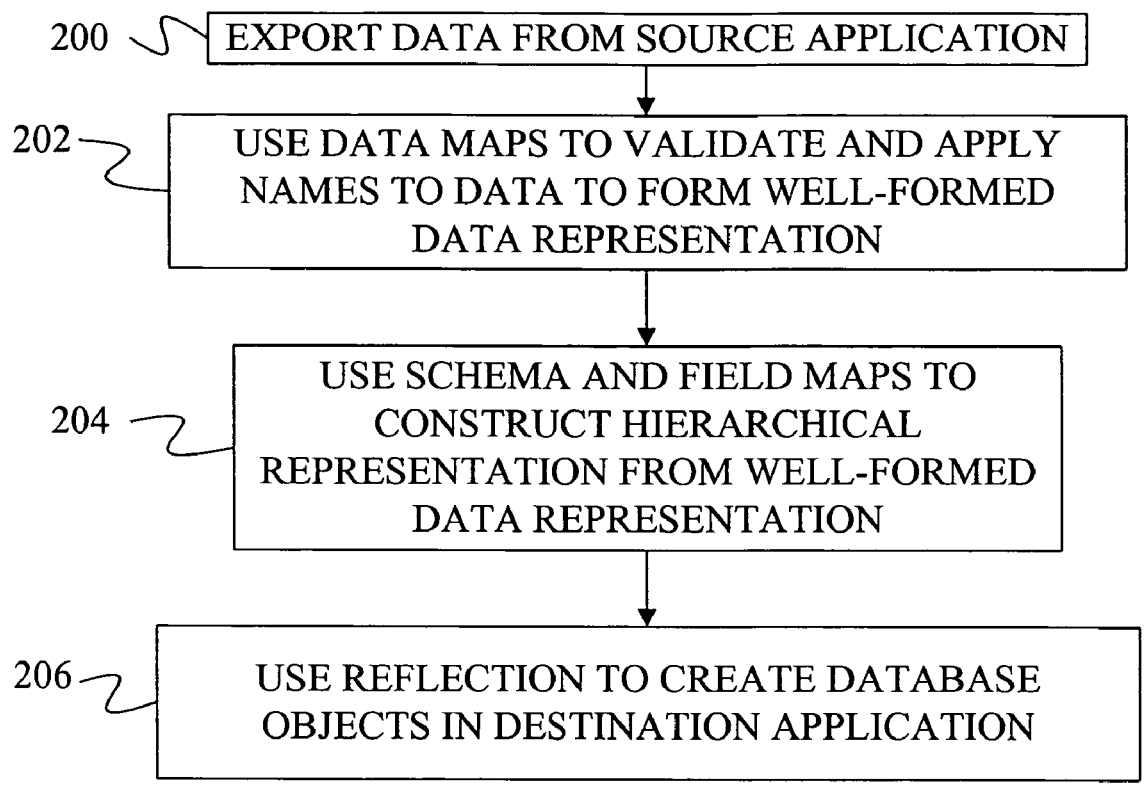
FIG. 2 is a flow diagram of a method of migrating data.

FIG. 1 provides a block diagram of elements used to migrate data and FIG. 2 provides a flow diagram of a method of migrating data. Specifically, the flow diagram of FIG. 2 provides a method for migrating data from a source database 100 of an application 102 to a destination database 104 of an application 106 as shown in FIG. 1.

In step 200 of FIG. 2, an export layer 114 exports data from source database 100 to form output file/objects 108. Under some embodiments, extraction layer 114 includes an independent retrieval component 116 that extracts data from database 100 using methods exposed by application 102. In particular, independent retrieval component 116 is able to instantiate classes defined in application 102 that expose methods that provide access to data in source database 100. Independent retrieval component 116 is typically written specifically for migrating data from application 102 but is not an integral part of application 102. Typically, independent retrieval component 116 is written based on information published in a software development kit (SDK) for application 102.

Output file/objects 108 can take any number of forms including XML documents, comma separate values (CSV) or a format associated with a particular program such as Excel® Brand Spreadsheet Software from Microsoft. Alternatively, output file/objects 108 can take the form of objects that have properties that are set to reflect data from database 100. By reference other objects, objects 108 may reflect a hierarchical relationship between elements in database 100.

Alternatively or additionally, extraction layer 114 may include an export tool 118 that forms part of application 102. Typically, export tool 118 is activated by a user 120 through a user interface produced by application 102.

Output file/objects 108 are provided to a first mapping layer 124 that includes data maps 126 and an extraction framework 128. At step 202, data maps 126 are used to validate the data in output files/objects 108 and to map source field names from source database 100 that are stored in output files/objects 108 to intermediate field names in a well-formed data representation 130. Under one embodiment, data maps 126 are XML documents that consist of a plurality of tags. Each tag has a name and delimits a description of the location where data to be associated with the tag name can be found in output files/objects 108. The tag name is the intermediate field name that is used in well-formed data representation 130. In further embodiments, each tag includes a type attribute such as string, integer, date, etc., that indicates the type for the data to be associated with the intermediate field name. For example, the following tag structure may be found in data maps 126:

---

<CustomerFirstName type=string> element=5
    SubstringBeginning=0 SubstringEnd=first_space
<CustomerFirstName/>

---

In this tag structure, the text up to the first space in the fifth element of each record in output files/objects 108 is assigned to an intermediate field named CustomerFirstName, which has a type of "string" in the well-formed data representation.

Extraction framework 128 validates the data indicated between the tags to ensure that it is of the same type set in the type attribute. For instance, if the type attribute is Date, extraction framework 128 ensures that the data parsed from output file 108 represents a date.

Under one embodiment, well-formed data representations 130 are XML structures that match the XML structures of data maps 126, but that have the data content of output files/objects 108 in place of the data location descriptions of data maps 126. For example, the example data map entry above would become:

```
<CustomerFirstName type=string> Jack
<CustomerFirstName/>
``` in the well-formed data representation 130, where "Jack" is taken from output file/objects 108. In data maps 126, a hierarchy is shown by nesting tags within each other, with outer tags being considered higher in the hierarchy than inner tags. As a result, XML structures found in well-formed data representation 130 also have a hierarchy.

In other embodiments, well-formed data representations 130 are objects that are instantiated by extraction framework 128 based on a hierarchy reflected in data maps 126. In particular, a set of objects (not shown) that have the same hierarchy as the hierarchy of data maps 126 can be provided. Certain tags in data maps 126 are associated with objects in the set of objects. For each tag that is associated with an object, an instance of the object is opened and the properties of the object are set based on the corresponding values in output file/objects 108.

Data maps 126 allow extraction framework 128 to divide data found in a single field in output files/objects 108 into multiple different fields in well-formed data representations 130. This can be done by providing instructions in data maps 126 to parse only portions of elements found in output files/objects 108. Thus one portion of an element may be associated with one tag name in data map 126 while another portion of the element may be associated with another tag in data map 126.

Data map 126 may also be used to aggregate data found in multiple fields in output files/objects 108 into a single intermediate field in well-formed data representation 130. For example, the data map may include:

```
<Address type=string>
    element=6 / element=7 / element=8
<address/>
```

Where element 6 may be a street address, element 7 may be a city, and element 8 may be a state in database 100. Thus, the elements of an address for well-formed data representations 130 are dispersed across several fields in database 100.

Well-formed data representations 130 are provided to a second mapping layer 132 that consists of a data transformation component 134, a schema 136 and field maps 138. At step 204, data transformation component 134 uses schema 136 and field maps 138 to transform well-formed data representation 130 into hierarchical representation 140.

Schema 136 describes the hierarchical relationship of objects in destination database 104 of application 106. In particular, schema 136 reflects references that one object makes to another object in database 104 as well as properties of objects. For example, an Address object in database 104 may reference a Country object. This would be reflected in schema 136 by indicating that "Country" is a child of "Address". For example, a schema 136 written in a schema markup language that reflects this relationship might be:

```
<xsd:element name="Address">
    <xsd:element name="Address1"/>
    <xsd:element name="Address2"/>
    <xsd:element name="Country"/>
</xsd:element>
``` where elements Address1, Address2, and Country are child elements of Address. In this example, each of these elements is a property of the Address object in the database and the Country element is also an object in the database. Thus, both properties and referenced objects appear as child elements in the schema.

Field maps 138 provide a mapping between the intermediate field names found in well-formed representation 130 and the schema field names in schema 136. Field maps 138 can divide data found in a single field in well-formed data representation 130 into multiple fields of schema 136. Thus, one portion of a field in well-formed data representation 130 may be associated with one field in schema 136 while another portion of the field may be associated with another field in schema 136. Field maps 138 can also aggregate data by combining data found in two separate fields of well-formed data representation 130 into one element of schema 136.

Thus, there are two mappings that occur under embodiments described herein. The first mapping uses data map 126 to map from source field names found in database 100 to intermediate field names in well-formed data representation 130. The second mapping uses field maps 138 to map from the intermediate field names in well-formed data representation 130 to schema field names in schema 136. By using two levels of mappings, these embodiments allow the structure of destination database 104 to be changed without having to alter extraction framework 128 to change the formation of well-formed data representation 130. Similarly, the structure of source database 100 can change without having to change data transformation component 134.

Hierarchical representation 140 may take the form of objects with associated metadata or may be in some other form such as an XML document. In either format, hierarchical representation 140 provides the 2 data from source database 100 in a hierarchical manner that reflects the hierarchy of objects in destination database 104. By creating a hierarchical representation 140, it is possible to write a more generalized import engine 146 that can rely on the hierarchy in hierarchical representation 140 to make determinations about what objects to create and save first in destination database 104 as discussed further below.

Figure 3:
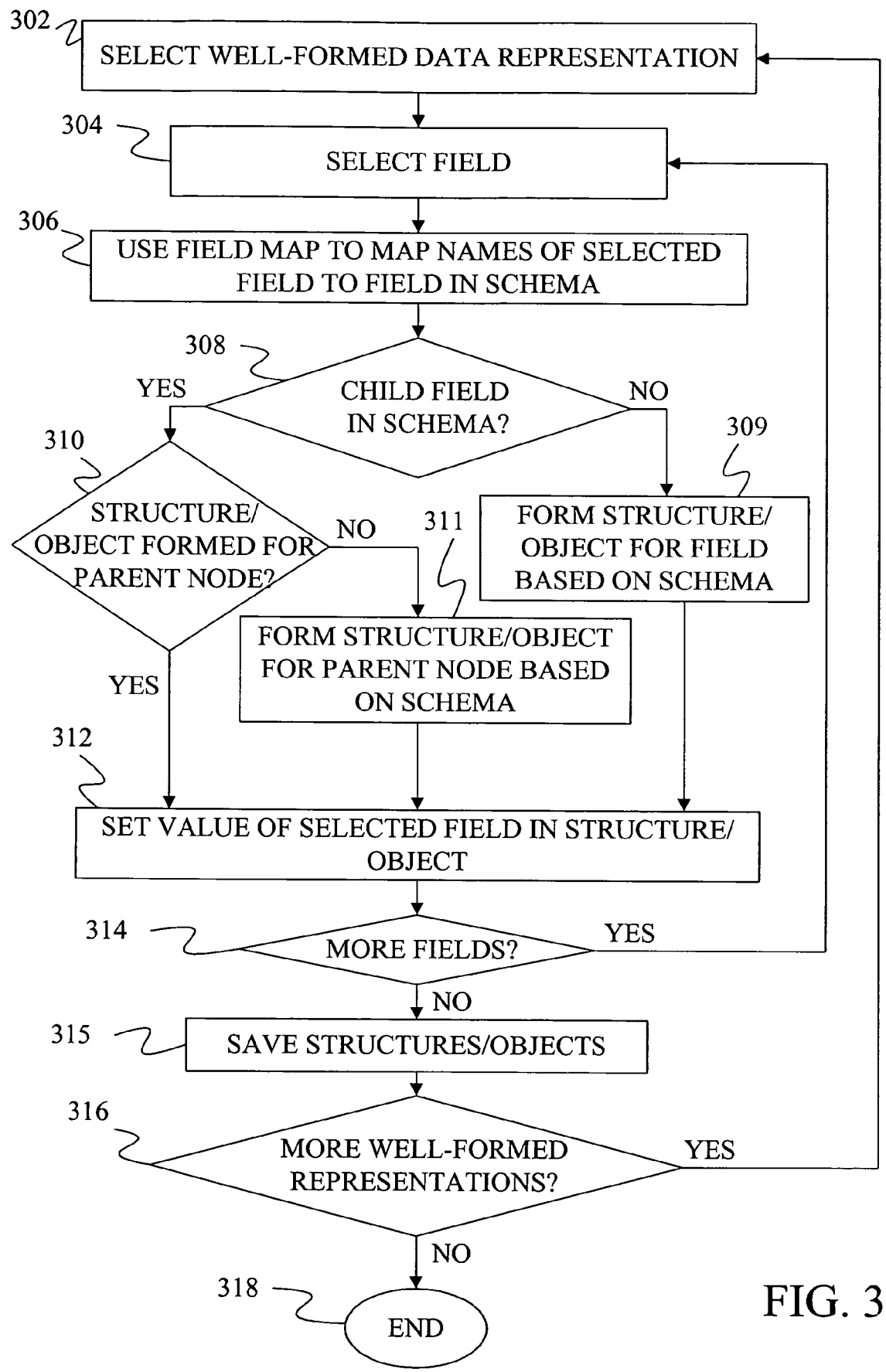
FIG. 3 is a flow diagram for construing hierarchical objects from well formed records.

FIG. 3 provides a flow diagram for using a schema and field maps to transform well-formed data representation 130 into hierarchical representation 140.

At step 302, data transformation component 134 selects one of well-formed data representations 130. At step 304, an intermediate field in the selected representation 130 is selected. At step 306, field maps 138 are used to map the intermediate field name to a schema field name in schema 136.

At step 308, data transformation component 134 determines if the selected field is a child field in schema 136. If it is not a child field, it is either a parent field or an independent field. As such, at step 309, data transformation component 134 forms an XML structure or an object for the field. If a structure is formed, it will include the child fields, if any, that are listed in the schema for this field. If an object is instantiated, it will contain properties that reflect the child fields, if any, found in the schema.

If the selected field is a child field in schema 136 at step 308, data transformation component 134 identifies the parent field of the selected field from schema 136 and determines if a structure or object has previously been formed in the hierarchical representation to represent the parent field at step 310. If a structure/object has not been formed for the parent field, a structure/object is formed for the parent field at step 311.

At step 312, after steps 309, 310, or 311, the value stored in well-formed data representation 130 for the selected field is stored in the structure/object for the selected field or the parent of the selected field at step 312. For objects, this involves setting a property in the object. For XML documents, this involves setting the value between tags that contain the schema field name set by schema 136 for the element.

At step 314, data transformation component 134 determines if there are more fields in the selected well-formed data representation. If there are more fields, the next field is selected by returning to step 304 and steps 306-312 are performed for the new field. When there are no more fields, the structure/objects that have been formed for the well-formed data representation are saved at step 315. For objects, this saving step can form metadata that describes the properties stored in the objects.

At step 316, data transformation component 134 determines if there are more well-formed data representations in well-formed data representations 130. If there are more well-formed data representations, the next well-formed data representation is selected by returning to step 302, and steps 304-315 are performed for the new well-formed data representation.

In step 206 of FIG. 2, hierarchical data representations 140 are imported into an importation layer 144 by an import engine 146 to form database objects 148.

Figure 4:
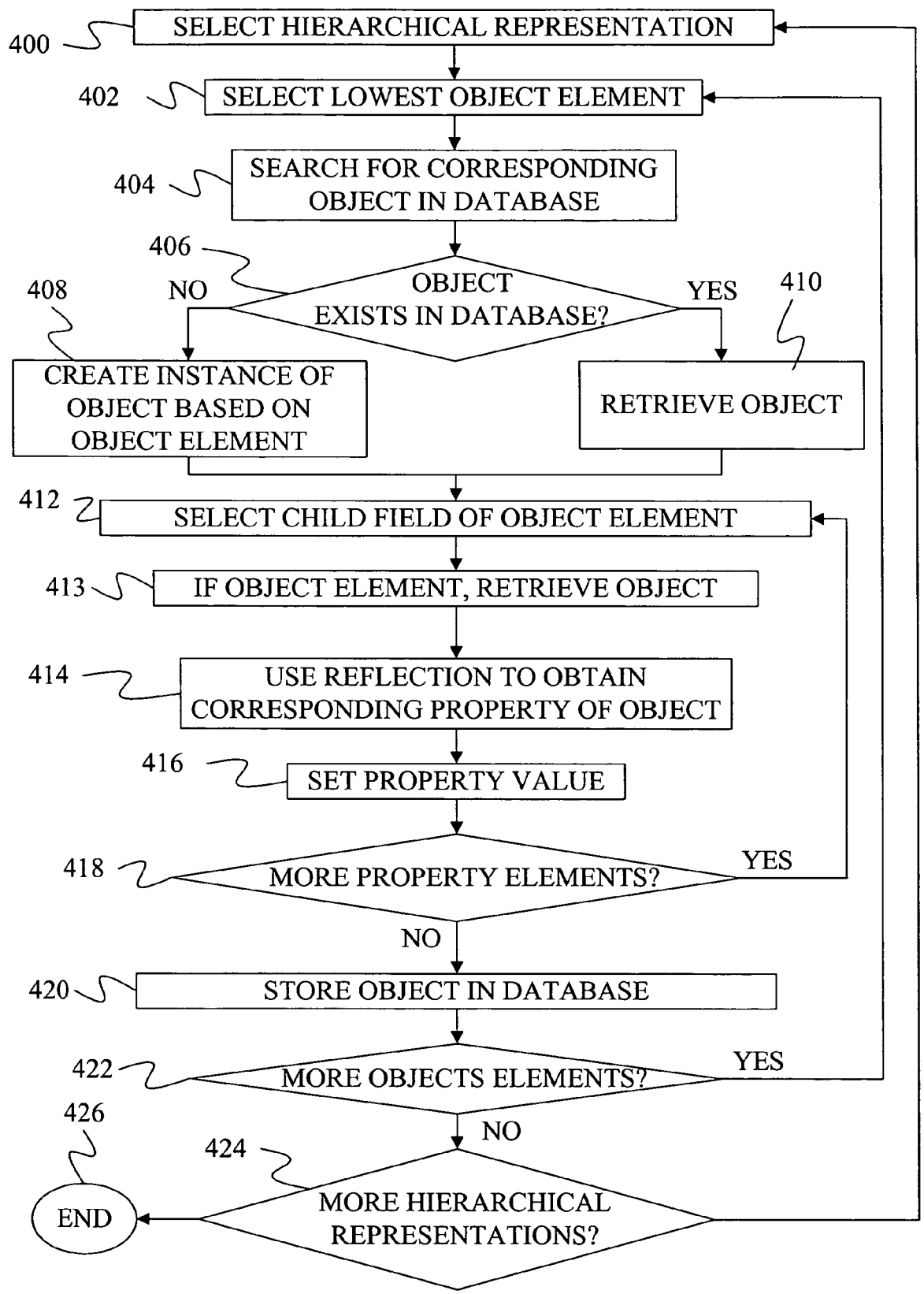
FIG. 4 is a flow diagram of a method of forming application objects from hierarchical objects.

FIG. 4 provides a flow diagram for a method for creating database objects 148. In step 400 of FIG. 4, a hierarchical representation is selected from hierarchical representations 140. At step 402, the lowest level element that represents an object in database 104 is selected. Because the hierarchical data representation is based on schema 136, identifying the lowest level object element is simplified. By starting with the lowest level object elements, objects that are referenced by other objects will be created first in database 104.

At step 404, import engine 146 searches the database for an existing object that has the same type and name property as the selected object element. The type for the selected object element is the schema field name, and the name property is the value associated with the schema field name in the hierarchical data representation. If such an object is not stored in database 104 at step 406, a new object is created at step 408. If the object is found in database 104 at step 406, the object is retrieved at step 410.

After an instance of the object has been created or the stored object has been retrieved, a child field for the selected object element is selected from hierarchical representation 140 at step 412. If the child field represents an object, the object is retrieved at step 413. The property that corresponds to the child element is then retrieved from the database object created for the parent object at step 414 based on the schema field name of the parent field in hierarchical representation 140. Under one embodiment, the property is retrieved using reflection methods, such as those exposed by the .Net framework. The value of the retrieved property is then set to the value in hierarchical representation 140 at step 416. Under some embodiments, the value is set using a reflection method.

For child fields that represent objects, setting step 416 involves setting a reference to the object associated with the child field. Because the hierarchical data representation is provided as input, selecting the lowest object element in the hierarchical data representation at step 402 ensures that the child object will be created before a reference to the child object is set in another object at step 416.

At step 418, import engine 146 determines if there are more child fields for this object element in hierarchical representation 140. If there are more child fields, the next child field is selected by returning to step 412, and steps 414 and 416 are performed for the next child field. When all of the values for the child fields in the hierarchical representation for the selected object element have been set in the object, the object is stored in database 104 at step 420.

At step 422, import engine 146 determines if there are more object elements in the hierarchical representation. If there are more object elements, the next lowest object element is selected by returning to step 402. Steps 404-420 are then performed for the new object element. When all of the object elements have been processed at step 422, import engine 146 determines if there are more hierarchical representations to process at step 424. If there are more hierarchical representations, the next hierarchical representation is selected by returning to step 400 and steps 402-422 are repeated for the next hierarchical representation. When all of the hierarchical representations have been processed, the method of FIG. 4 ends at step 426.

Figure 5:
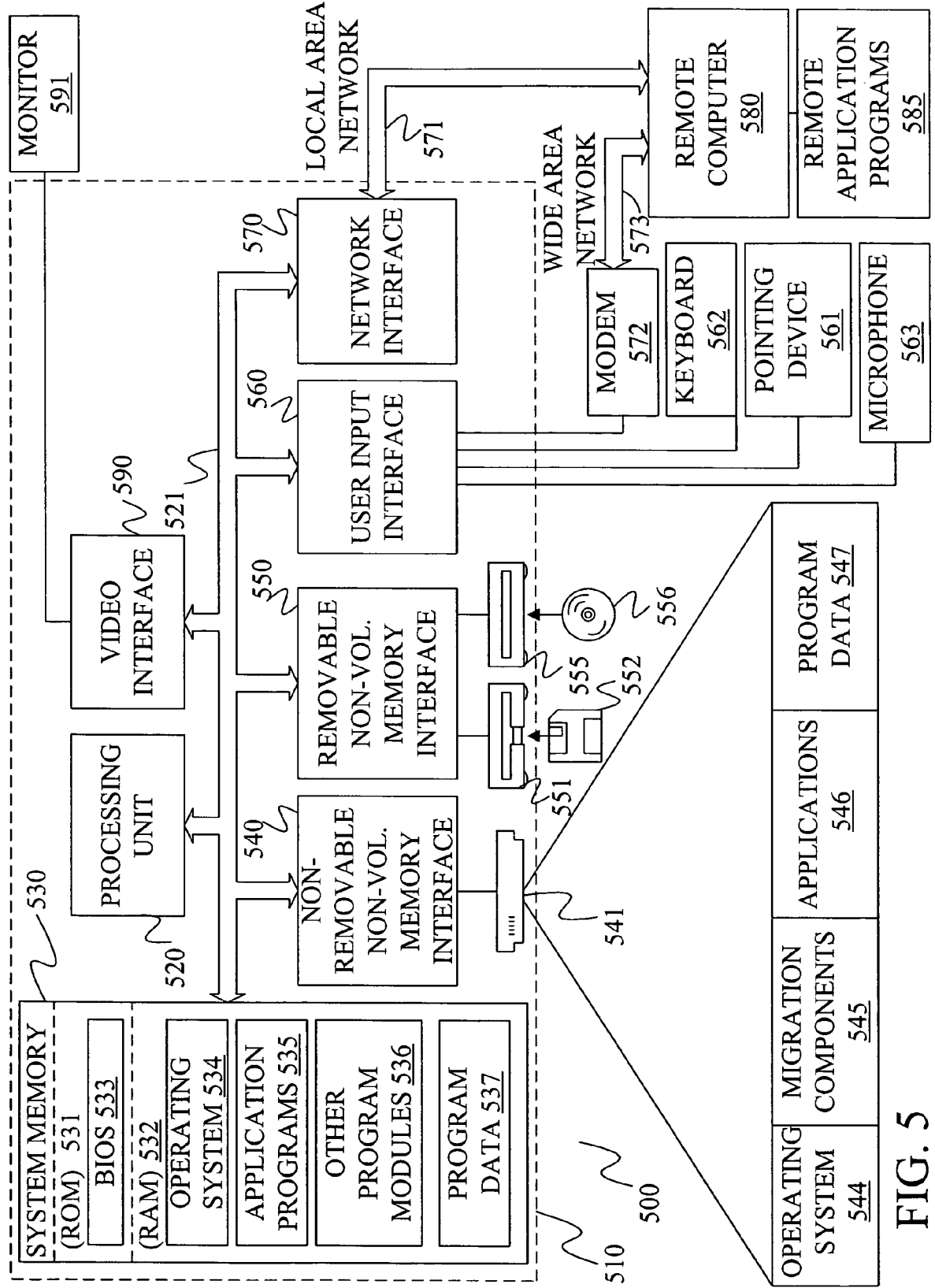
FIG. 5 is a block diagram of an exemplary computing environment.

FIG. 5 illustrates an example of a suitable computing system environment 500 on which embodiments may be implemented. The computing system environment 500 is only one example of a suitable computing environment and is not intended to suggest any limitation as to the scope of use or functionality of the claimed subject matter. Neither should the computing environment 500 be interpreted as having any dependency or requirement relating to any one or combination of components illustrated in the exemplary operating environment 500.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 510. Components of computer 510 may include, but are not limited to, a processing unit 520, a system memory 530, and a system bus 521 that couples various system components including the system memory 530 to the processing unit 520.

Computer 510 typically includes a variety of computer-readable media. Computer-readable media can be any available media that can be accessed by computer 510 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, migration components 545, applications 546, and program data 547. Note that these components can either be the same as or different from operating system 534, application programs 535, other program modules 536, and program data 537.

A user may enter commands and information into the computer 510 through input devices such as a keyboard 562, a microphone 563, and a pointing device 561, such as a mouse, trackball or touch pad. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590.

The computer 510 is operated in a networked environment using logical connections to one or more remote computers, such as a remote computer 580. The remote computer 580 may be a personal computer, a hand-held device, a server, a router, a network PC, a peer device or other common network node, and typically includes many or all of the elements described above relative to the computer 510. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on remote computer 580. It will be appreciated that the network connections shown are exemplary and other means of establishing a communications link between the computers may be used.

Although the subject matter has been described in language specific to structural features and/or methodological acts, it is to be understood that, the subject matter defined in the appended claims is not necessarily limited to the specific features or acts described above. Rather, the specific features and acts described above are disclosed as example forms of implementing the claims.

What is claimed is:

1. A method comprising:
  receiving a data representation containing data from a source database by:
    exporting data from the source database to form an output file comprising a plurality of records, each record comprising a plurality of fields; and
    mapping each field of each record of the output file to fields in the data representation using a data map, wherein mapping fields of a record of the output file to fields of the data representation comprises mapping two fields of the output file to a single field of the data representation;

applying a field map to a first element and a second element in the data representation to identify a first schema element, a second schema element, and a third schema element in a schema, wherein applying the field map comprises mapping a first portion of a value associated with the first element to the first schema element, mapping a second portion of the value associated with the first element to the third schema element, and mapping a value associated with the second element to the second schema element;

using a hierarchical relationship between the first schema element and the second schema element that is described in the schema to construct a hierarchical data representation comprising the first schema element and the second schema element;

determining that a first database object associated with the first schema element is to be instantiated before a second database object associated with the second schema element based on the hierarchical relationship between the first schema element and the second schema element in the hierarchical data representation;

ensuring that the first database object has been created and stored in a destination database by:
  searching the destination database for the first database object based on a value associated with the first schema element in the hierarchical data representation; and
  based on the search, determining that the first database object is stored in the destination database; and creating and storing the second database object in the destination database based on the second schema element after searching the destination database for the first database object.

2. The method of claim 1 wherein creating and storing the second database object comprises:
  creating the second database object;
  referencing the first database object in the second database object; and
  storing the second database object.

3. The method of claim 2 wherein referencing the first database object in the second database object comprises using a reflection method to identify a property in the second database object and to set the property to the first database object.

4. The method of claim 1 wherein constructing a hierarchical data representation comprises storing a value that is associated with first element so that the value is associated with the first schema element in the hierarchical data representation.

5. The method of claim 1 wherein mapping fields of a record of the output file to fields of the data representation comprises:
  mapping a first part of a first field of the output file to a first field of the data representation; and
  mapping a second part of the first field of the output file to a second field of the data representation.

6. A method comprising
  exporting data from a source database to form a first representation of the data, the first representation comprising source field names;
  forming a second data representation from the first representation using a data map, the second data representation comprising intermediate field names and the data map associating intermediate field names of the second data representation with source field names of the first representation of the data wherein the data map associates two source field names with a single intermediate field name;
  forming a hierarchical data representation from the second data representation using a field map and a schema, the schema providing hierarchical relationships between schema field names that represent hierarchical relationships between database objects in a destination database and the field map providing mappings between intermediate field names and schema field names such that one portion of a field in the second data representation is mapped to a first schema field name and a second portion of the field in the second data representation is mapped to a second schema field name and a second field in the second data representation is mapped to a third schema filed name; and
  forming database objects for a destination database based on the hierarchical data representation through steps comprising
  determining that a first database object associated with the first schema field name must be created before a second database object associated with the second schema field name based on the relationship between the first schema field name and the second schema field name in the hierarchical data representation;
  ensuring that the first database object has been created and stored in the destination database by:
  searching the destination database for the first database object based on a value associated with the first schema field name in the hierarchical data representation; and
  based on the search, determining that the first database object is stored in the destination database; and
  creating and storing the second database object in the destination database based on the second schema field name after searching the destination database for the first database object.

7. The method of claim 6 wherein creating and storing the second database object comprises:
  creating the second database object;
  accessing a property associated with the second database object; and
  setting a property of the second database object to reference the first database object.

8. The method of claim 7 wherein accessing a property of the second object comprises using a reflection method to acquire the property of the second object.

9. The method of claim 7 further comprising associating a fourth schema field name with a property of the second object and setting the value of the property to match a value set for the fourth schema field name in the hierarchical data representation.

10. A computer-readable storage medium having computer-executable instructions stored thereon, that when executed by a processor cause the processor to perform steps comprising:
  receiving a data representation containing data from a source database by:
  exporting data from the source database to form an output file comprising a plurality of records, each record comprising a plurality of fields; and
  mapping each field of each record of the output file to fields in the data representation using a data map, wherein mapping fields of a record of the output file to fields of the data representation comprises mapping two fields of the output file to a single field of the data representation;
  applying a field map to a first element and a second element in the data representation to identify a first schema element, a second schema element, and a third schema element in a schema, wherein applying the field map comprises mapping a first portion of a value associated with the first element to the first schema element, mapping a second portion of the value associated with the first element to the third schema element, and mapping a value associated with the second element to the second schema element;

using a hierarchical relationship between the first schema element and the second schema element that is described in the schema to construct a hierarchical data representation comprising the first schema element and the second schema element;

determining that a first database object associated with the first schema element is to be instantiated before a second database object associated with the second schema element based on the hierarchical relationship between the first schema element and the second schema element in the hierarchical data representation;

ensuring that the first database object has been created and stored in a destination database by;

searching the destination database for the first database object based on a value associated with the first schema element in the hierarchical data representation; and based on the search, determining that the first database object is stored in the destination database; and creating and storing the second database object in the destination database based on the second schema element after searching the destination database for the first database object.

* * * * *